US008235367B2

(12) United States Patent
Markuson et al.

(10) Patent No.: US 8,235,367 B2
(45) Date of Patent: Aug. 7, 2012

(54) SELECTIVELY POSITIONING A WORKPIECE

(75) Inventors: Valerie Sue Markuson, Fridley, MN (US); Kevin Lambert Mayer, Apple Valley, MN (US)

(73) Assignee: Seagate Technology LLC, Cupertino, CA (US)

( * ) Notice: Subject to any disclaimer, the term of this patent is extended or adjusted under 35 U.S.C. 154(b) by 547 days.

(21) Appl. No.: 12/482,211

(22) Filed: Jun. 10, 2009

(65) Prior Publication Data

US 2010/0314815 A1    Dec. 16, 2010

(51) Int. Cl.
*B23Q 1/64* (2006.01)

(52) U.S. Cl. .............. 269/56; 269/71; 269/61; 269/296; 269/304

(58) Field of Classification Search .................... 269/56, 269/71, 61, 296, 304, 75, 21, 289 R, 903, 269/60; 248/288.11, 181.1
See application file for complete search history.

(56) References Cited

U.S. PATENT DOCUMENTS

| | | | | | |
|---|---|---|---|---|---|
| 687,183 | A | * | 11/1901 | Kolander | 403/141 |
| 1,414,970 | A | * | 5/1922 | Nelson | 409/168 |
| 1,883,276 | A | * | 10/1932 | Zerk | 248/188.5 |
| 1,962,547 | A | * | 6/1934 | Zerk | 248/188.8 |
| 2,574,914 | A | * | 11/1951 | Du Bois | 409/165 |
| 2,783,531 | A | * | 3/1957 | Eisler | 269/61 |
| 2,993,395 | A | * | 7/1961 | Bohn | 269/75 |
| 3,737,130 | A | * | 6/1973 | Shiraishi | 248/181.1 |
| 3,815,892 | A | * | 6/1974 | Tulk | 269/75 |
| 3,990,689 | A | * | 11/1976 | Eklund, Sr. | 269/21 |
| 4,042,119 | A | * | 8/1977 | Hassan et al. | 269/56 |
| 4,066,231 | A | * | 1/1978 | Bahner et al. | 248/552 |
| 4,262,891 | A | * | 4/1981 | Kinney | 269/71 |
| 4,320,926 | A | | 3/1982 | Heinemann et al. | |
| 4,369,958 | A | * | 1/1983 | Maynard | 269/61 |
| 4,461,463 | A | | 7/1984 | Okubo | |
| 4,767,109 | A | * | 8/1988 | Raketich | 269/61 |
| 4,852,306 | A | | 8/1989 | Harmand | |
| 4,934,671 | A | | 6/1990 | Laninga et al. | |
| 5,315,749 | A | | 5/1994 | Nenadic et al. | |
| 5,738,344 | A | * | 4/1998 | Hagman | 269/75 |
| 5,918,867 | A | * | 7/1999 | Goodyear | 269/71 |
| 6,012,711 | A | | 1/2000 | Cipolla | |
| 6,019,154 | A | | 2/2000 | Ma et al. | |
| 6,032,938 | A | * | 3/2000 | Jones | 269/64 |
| 6,083,333 | A | * | 7/2000 | Van Beers et al. | 156/73.1 |
| 6,113,089 | A | * | 9/2000 | Kleinbongartz | 269/166 |
| 6,175,999 | B1 | * | 1/2001 | Sloan et al. | 29/281.4 |
| 6,502,808 | B1 | * | 1/2003 | Stone et al. | 269/21 |
| 6,575,443 | B2 | * | 6/2003 | Kick | 269/75 |
| 6,705,019 | B2 | * | 3/2004 | Mauro | 33/569 |
| 7,290,760 | B1 | * | 11/2007 | Lindsay et al. | 269/75 |
| 7,300,043 | B1 | * | 11/2007 | Lindsay et al. | 269/75 |
| 7,635,119 | B1 | * | 12/2009 | Patel | 269/73 |
| 2007/0176073 | A1 | | 8/2007 | Simic | |
| 2008/0054541 | A1 | | 3/2008 | Dixon et al. | |
| 2010/0252978 | A1 | * | 10/2010 | Philippe | 269/296 |

\* cited by examiner

*Primary Examiner* — George Nguyen

(74) *Attorney, Agent, or Firm* — McCarthy Law Group; Mitchell K. McCarthy

(57) ABSTRACT

An apparatus and associated method are provided for positioning a workpiece. A workpiece positioner has a fixed base, and a support member is connected to the base by a joint that permits selectively articulating the support member with respect to the base. A plate defines a feature sized for operably supporting the workpiece. A connector is used to connect the plate to the support member. The connector fixes the plate in articulation with the support member so that a selected articulation of the support member with respect to the base defines a corresponding plane in which the plate is disposed. The connector also permits sliding movement of the plate in any direction within the corresponding plane to orient the workpiece in a desired position.

20 Claims, 6 Drawing Sheets

SELECTIVELY POSITIONING A WORKPIECE

BACKGROUND

Various positioning devices have been used in the past to manipulate workpieces during processes such as testing and assembling. Such positioning devices are particularly important in manufacturing environments where work stations are dedicated to a particular process. Typically, each workpiece is supported and then selectively positioned and perhaps even repositioned one or more times as necessary in order to perform processes such as inspecting, cleaning, and/or testing. The workpiece may be a single component, or it may be a tray of components that are collectively positioned and individually processed.

Using a positioning device instead of manipulating the workpiece manually can advantageously prevent the occurrence of operator injuries such as carpal tunnel syndrome and various repetitive motion injuries to the operator's arm, wrist, and hand. However, in many instances the complexity and speed of the process require that the positioning device offer the dexterity of manually positioning the workpiece. That is, to be of value the workpiece positioned must be capable of emulating the intricate workings of the human hand in grasping and selectively positioning the workpiece to any of an infinite variety and sequences of positions. Thus, a capable workpiece positioner must load and unload the workpieces rapidly, must further be amenable to positioning a loaded workpiece to any desired position with minimal effort, and furthermore must hold the workpiece at a desired position until further effort is expended to either reposition or unload the workpiece. It is not unusual for particular processing to require that two of the same workpieces be positioned and/or repositioned completely differently, requiring the positioning device to be agile and flexible. In the face of these odds, any need for the operator to manually supplement the positioning capability of the positioning device during processing can result in the same type of injuries as if no positioning device was used at all.

Cost and design complexity are factors running counter to a solution that meets all the needs of a workpiece positioner device. Previously attempted solutions for workpiece positioners that are adapted for use with hand-held sized workpieces are either limited in respect to the available range of motion or prohibitively complex and expensive. What is needed is a straightforward device that is capable of quick loading and instantaneous and infinitely variable positioning—one that emulates the human hand—for use in processing the workpiece. The present embodiments are directed to a solution to that need.

SUMMARY OF THE INVENTION

In some embodiments a workpiece positioner is provided for positioning a workpiece. The workpiece positioner has a fixed base, and a support member is connected to the base by a joint that permits selectively articulating the support member with respect to the base. A plate defines a feature sized for operably supporting the workpiece. A connector is used to connect the plate to the support member. The connector fixes the plate in articulation with the support member so that a selected articulation of the support member with respect to the base defines a corresponding plane in which the plate is disposed. The connector also permits sliding movement of the plate in any direction within the corresponding plane to orient the workpiece in a desired position.

In some embodiments a workpiece positioner is provided that has a fixed base defining a socket. A support member defines a planar surface and a ball end, the ball end being cooperatively engageable with the socket to permit selectively articulating the planar surface in any direction with respect to the base. A sub plate defines an aperture, and a stake connects the sub plate to the support member. The stake has a head portion and a pin portion extending from the head and passing through the aperture to connect to the support member. The sub plate is operably constrained between the head and the planar surface to fix the sub plate in articulation with the support member so that a selected articulation of the support member with respect to the base defines a corresponding plane in which the sub plate is disposed. The sub plate is further operably constrained between the head and the planar surface to permit lateral movement of the sub plate in any direction within the corresponding plane. A top plate is affixed to the sub plate to permit movement together in unison. The top plate defines a feature that is sized for operably supporting a workpiece at the selected articulation and the selected lateral position.

In some embodiments a method is provided that includes the steps of: supporting a workpiece by engaging it hands-free by a support feature defined by a workpiece positioner device; articulating the support feature to a selected angle to dispose the support feature in a corresponding plane by articulating a joint supporting the support feature with respect to a fixed base; and sliding the support feature in any direction within the corresponding plane with respect to the fixed base to dispose the support feature in a desired working position.

DETAILED DESCRIPTION

The embodiments of this invention are generally directed to an apparatus and an associated method for fixturing a workpiece to facilitate processing the workpiece. The skilled artisan will appreciate that the present fixturing solution is particularly useful where there is a need for dynamically positioning and perhaps repositioning the workpiece one or more times during the processing. Previously attempted solutions either statically hold a workpiece and or are amenable to repositioning the workpiece only within a limited range of motion. The present embodiments are distinguishable from those solutions in the respect that the present embodiments provide a solution that emulates the dexterity and random flexibility capabilities of the human hand when used in manipulating the workpieces manually.

Figure 1:
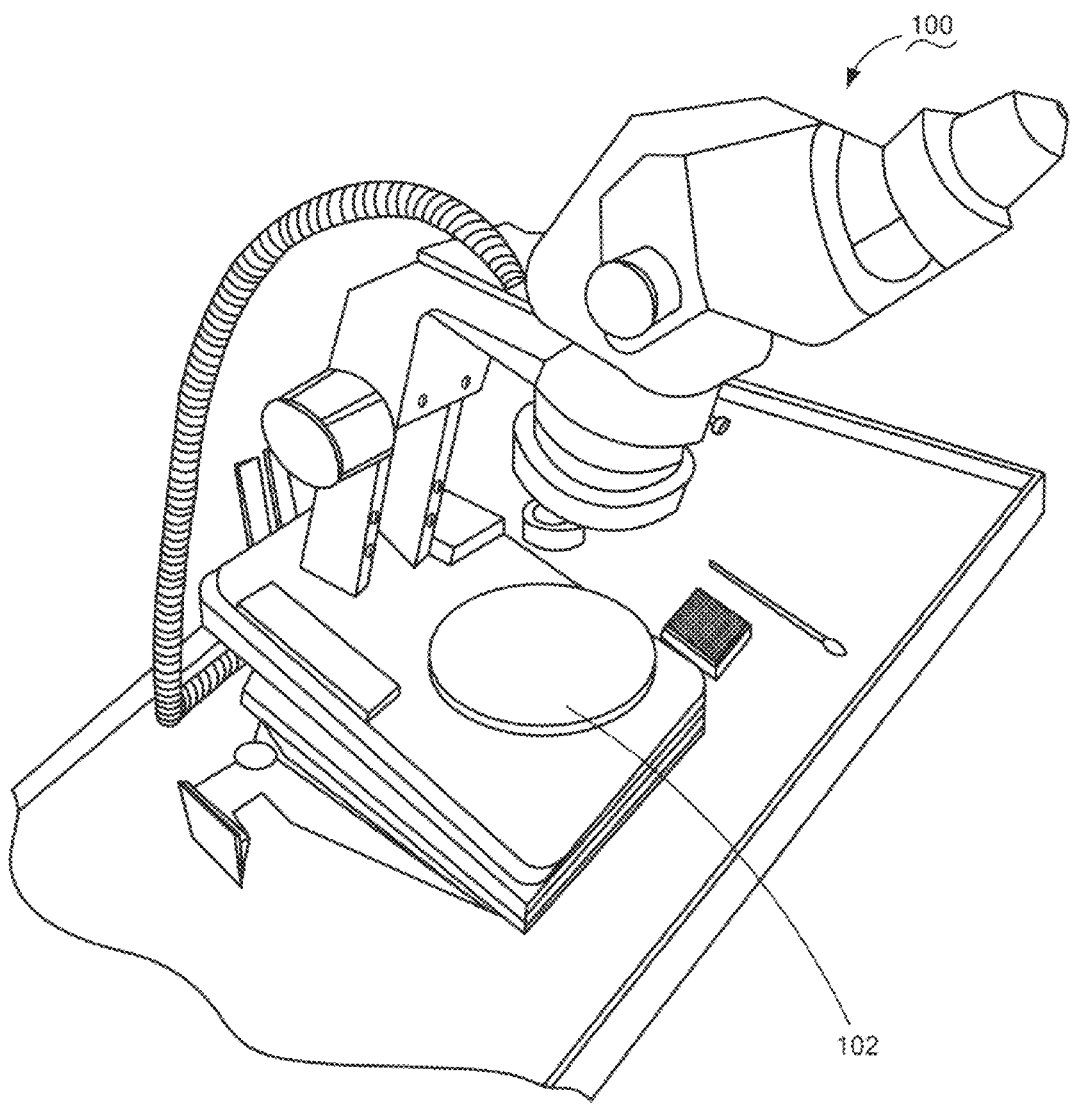
FIG. 1 is an isometric depiction of a related art workstation.
Figure 2:
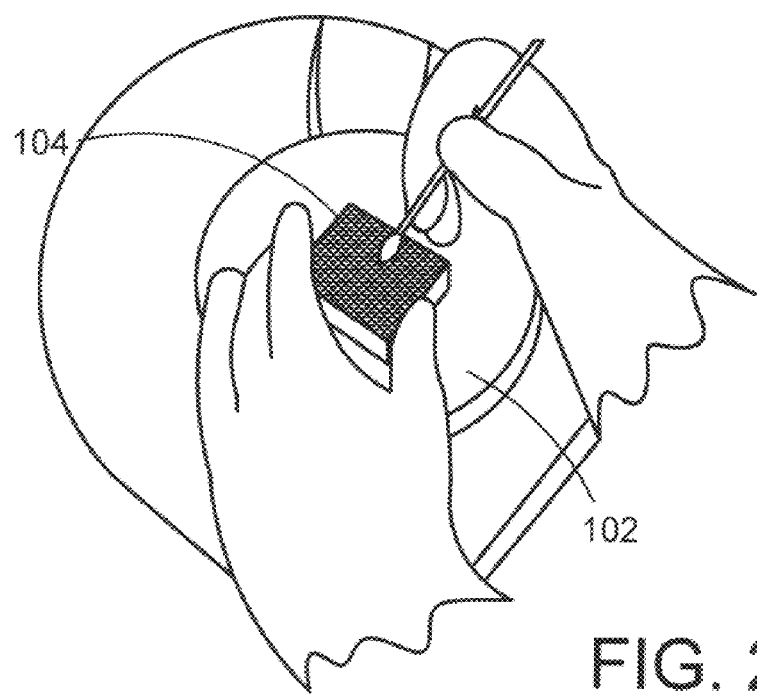
FIG. 2 is an enlarged isometric depiction of a portion of the workstation of FIG. 1.

FIG. 1 is used illustratively, without limitation, to present a related art work station that is well suited for being modified to enjoy the advantages of the embodiments of the present invention. The work station is equipped with a microscope 100 that the operator uses to magnify her view of a workpiece that is placed upon a tray 102 to present it to the lens of the microscope 100. FIG. 2 is an enlarged portion of the work station of FIG. 1 depicting a workpiece 104 on the tray 102 being processed by the operator manipulating it manually. In these illustrative embodiments the workpiece 104 is depicted as being a tray holding a plurality of small components, although the present embodiments are not so limited.

FIG. 2 depicts the operator controlling a swab with her right hand to clean and condition each of the individual components in the tray. The defects and/or contaminants that the operator is inspecting the components for are more readily viewable by continuously repositioning the workpiece 104 in order to alter the angle with which an overhead spotlight illuminates the different perspectives of the component presently being inspected. In order to perform this necessary repositioning, it is noted that the operator must grasp the workpiece 104 by extending her index finger and thumb to statically grip the workpiece 104 with her left hand. She must then continuously reposition the workpiece 104 by articulating her wrist and forearm while maintaining the static grip. This is an ergonomically unsound requirement that is known to make the operator susceptible to carpal tunnel syndrome and various repetitive motion injuries.

Figure 3:
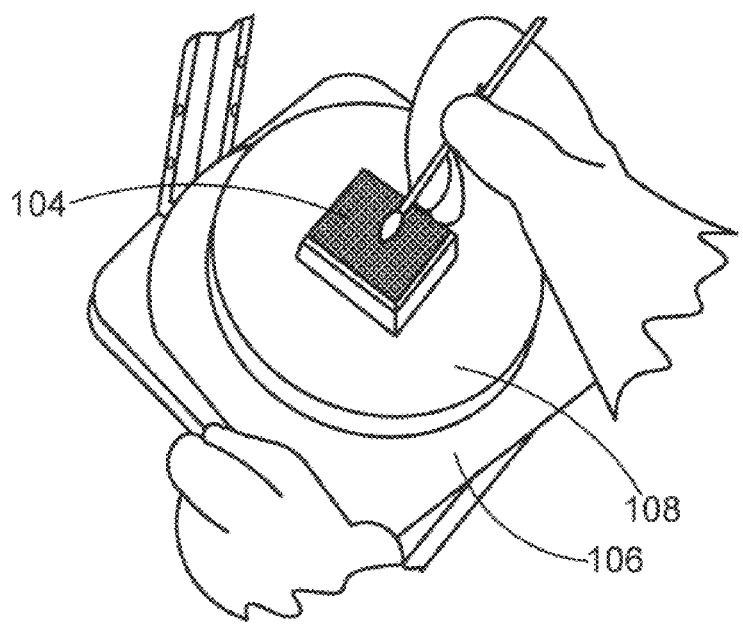
FIG. 3 is an enlarged isometric depiction similar to FIG. 2 but the workstation having been modified to include a workpiece positioner that is constructed in accordance with the present embodiments.

FIG. 3 is a view similar to FIG. 2 but depicting the work station having been modified by replacing the tray 102 with a workpiece positioner 106 that is constructed in accordance with embodiments of the present invention. The workpiece positioner 106 permits the operator to selectively reposition the workpiece 104 both angularly and linearly by simply urging a top plate 108 with either of her hands in the direction of desired movement. The workpiece positioner 106 then holds the workpiece at the desired position, permitting the operator to swab the workpiece 104 while resting her left hand in an ergonomically acceptable neutral position as shown.

Figure 4:
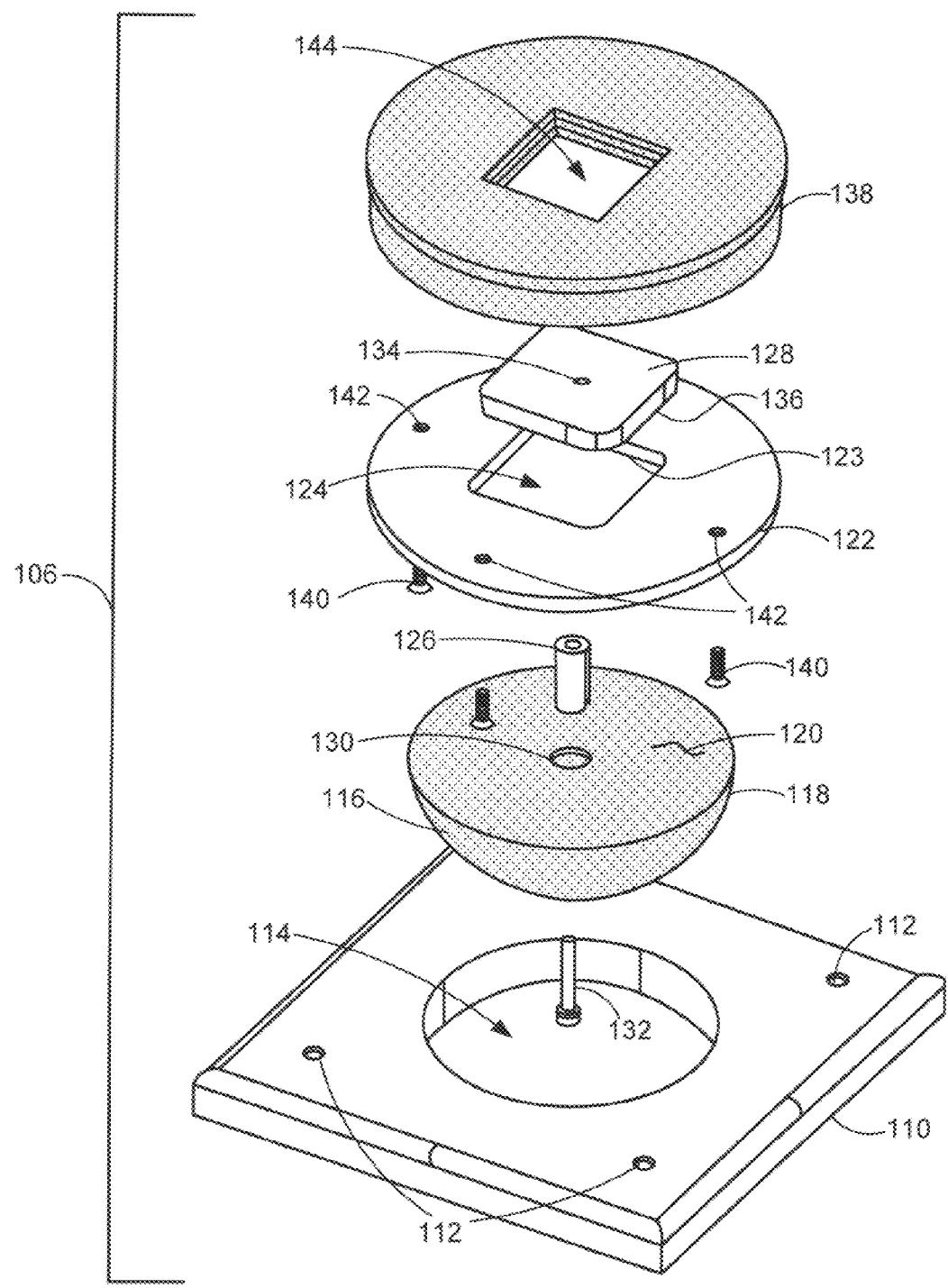
FIG. 4 is an exploded isometric depiction of the workpiece positioner of FIG. 3.

FIG. 4 is an exploded isometric depiction of the workpiece positioner 106 in FIG. 3. A base 110 is fixed in place by attaching it to the microscope 100 (FIG. 1) or some other supporting structure, such as by passing fasteners through the apertures 112. The base 110 defines an aperture 114 that is sized to be smaller than the largest diameter of a partially spherical surface 116 defining a ball end of a support member 118. For a maximum range of articulated motion, preferably the partially spherical surface 116 is hemispherical. The support member 118 also defines a planar surface 120 that is contiguous with the partially spherical surface 116. The ball end of the support member 118 and the aperture 114 cooperate to join the support member 118 to the base 110 by a ball-and-socket joint that permits selectively articulating the planar surface 120 with respect to the fixed base 110.

A sub plate 122 has an interior surface 123 that defines an aperture 124. The sub plate 122 slidingly engages against the planar surface 120 of the support member 118, and is constrained within limits of lateral movement in that sliding engagement by a stake connector in cooperation with the aperture. Preferably, the stake is at least partially removably attached to facilitate the replacement of the sub plate 122 for repair or maintenance purposes, or to change the configuration of the aperture 124 to control the lateral range of motion as desired. The depicted stake is constructed of a pin 126 that is connected to the support member 118 and that protrudes through the aperture 124 in the sub plate 122. The stake also has a head 128 connected to the distal end of the pin 126. In the illustrative embodiments of FIG. 4 the pin 126 is cylindrically shaped with a longitudinal passage. The pin 126 is attached within an aperture 130 passing through the support member 118, such as by being press fit or adhered in the aperture 130. A fastener 132 passes through the passage in the pin 126 and engages a threaded opening 134 in the head 128. The protuberant portion of the pin 126 extends beyond the planar surface 120 to span the thickness of the sub plate 122 plus a desired clearance, so that drawing the head 128 against the end of the pin 126 by advancing the fastener 132 does not bind the sub plate 122 to prevent lateral movement.

The head 128 defines an under side planar surface 136 that is sized larger than the aperture 124 in the sub plate 122 so that the sub plate 122 is constrained in sliding engagement between the planar surface 120 of the support member 118 and the planar surface 136 of the head 128. That arrangement fixes the sub plate 122 in articulation with the support member 118 so that a selected articulation of the support member 118 with respect to the base 110 defines a corresponding plane in which the sub plate 122 is disposed. However, the constraint of the sub plate 122 permits it to move laterally in any direction within the corresponding plane. In other words, the sub plate 122 and support member 118 articulate together in unison, but the sub plate 122 is free to move laterally in any direction with respect to the support member 118.

The resistance to lateral movement can be controlled by selecting the clearance between the head 128 and the sub plate 122, as is determined by the length of the protuberant portion of the pin 126. Selecting relatively lubricious materials for constructing the mating parts also facilitates achieving the desired resistance to lateral movement and reduces the wear and tear on mating surfaces. Some resistance is preferable, however, to frictionally retain the sub plate 122 after having been moved to a desired lateral position. The selection of appropriate dissipative materials is also important if it is necessary to prevent electrostatic discharge to the workpiece 104 during processing.

A top plate 138 is affixed to the sub plate 122 so that they move together in unison, such as by the use of fasteners 140 that pass through apertures 142 in the sub plate 122 and threadingly engage take holes provided in the underside of the top plate 138. Again, using removable fasteners in this manner facilitates replacing parts as necessary.

Figure 5:
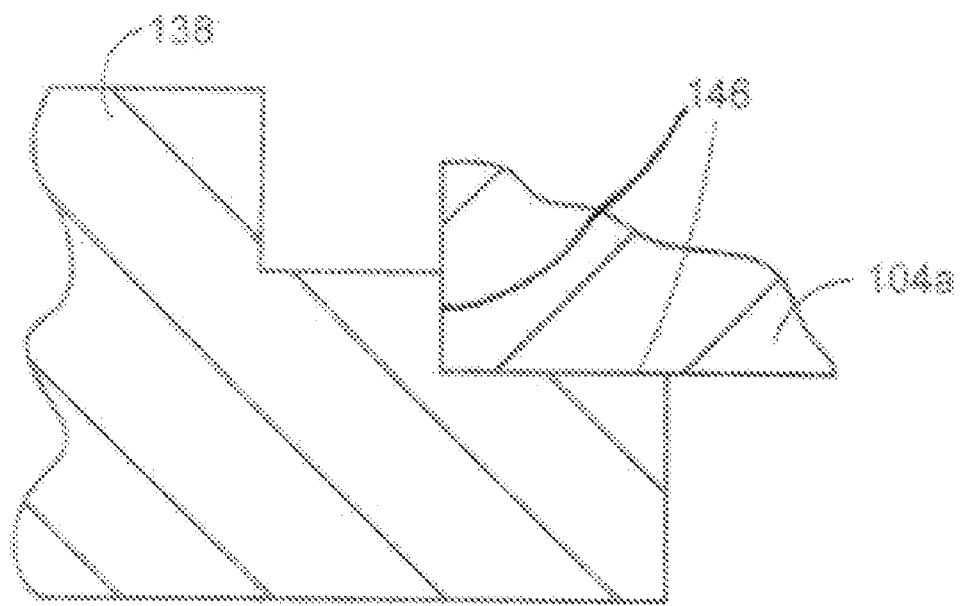
FIG. 5 is an enlarged cross sectional depiction of a portion of the workpiece positioner of FIG. 4.
Figure 5:
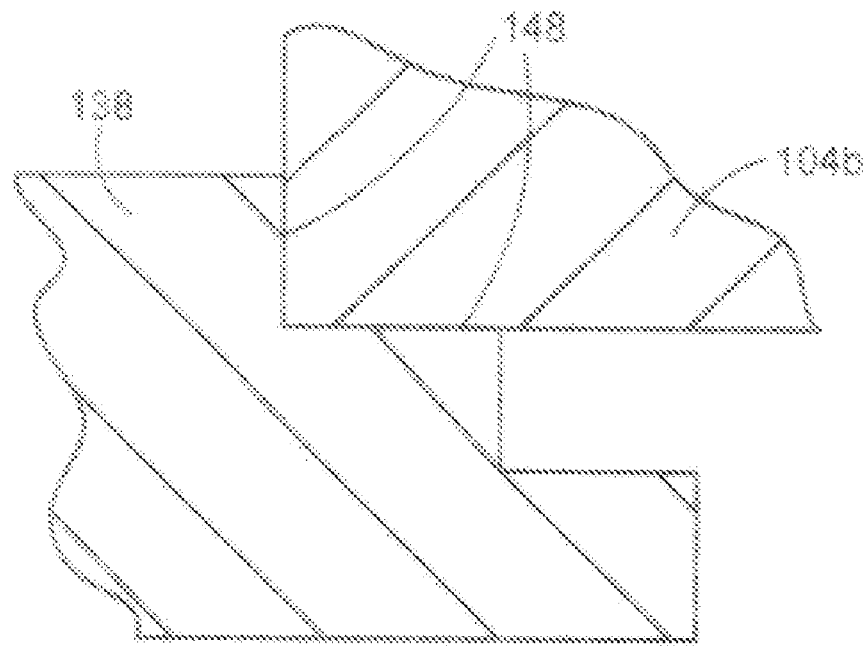

The top plate defines a feature, such as the aperture 144, that is sized for operably supporting the workpiece 104 (FIG. 3) during processing at the desired articulation and lateral position. Where differently sized workpieces 104 are processed in the work station, the aperture 144 can be sized to accommodate both. For example, FIG. 5 is an enlarged cross sectional portion depicting the top plate 138 having a first surface 146 defining a first feature sized to receivingly engage a first workpiece 104a, and having a second surface 148 defining a second feature sized differently than the first feature to receivingly engage a second workpiece 104b.

Figure 6:
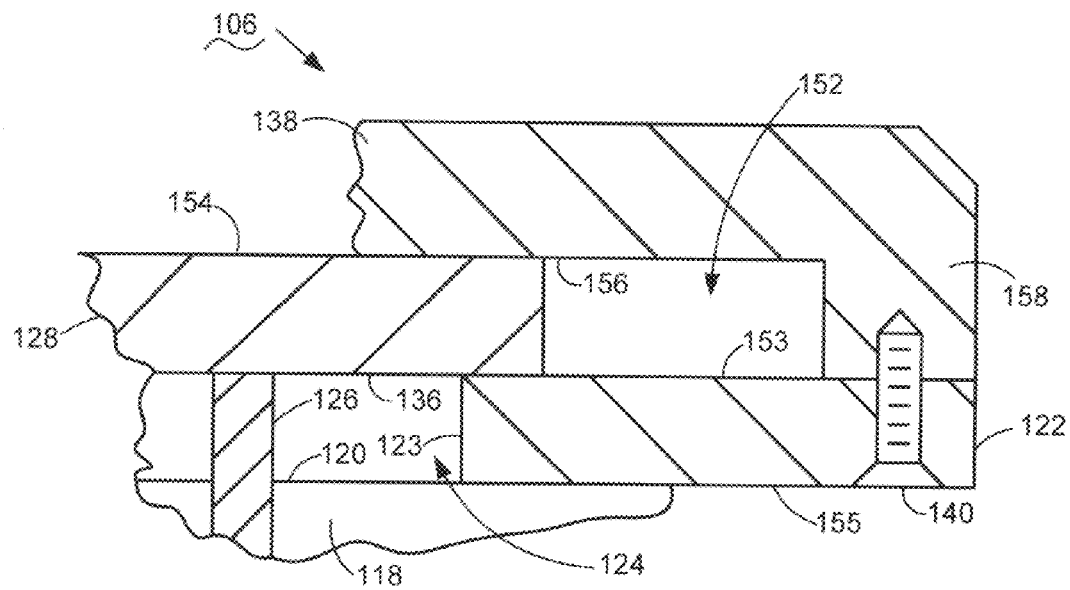
FIGS. 6 and 7 are similar cross sectional depictions of a portion of the workpiece positioner of FIG. 4 at two different lateral positions.
Figure 7:
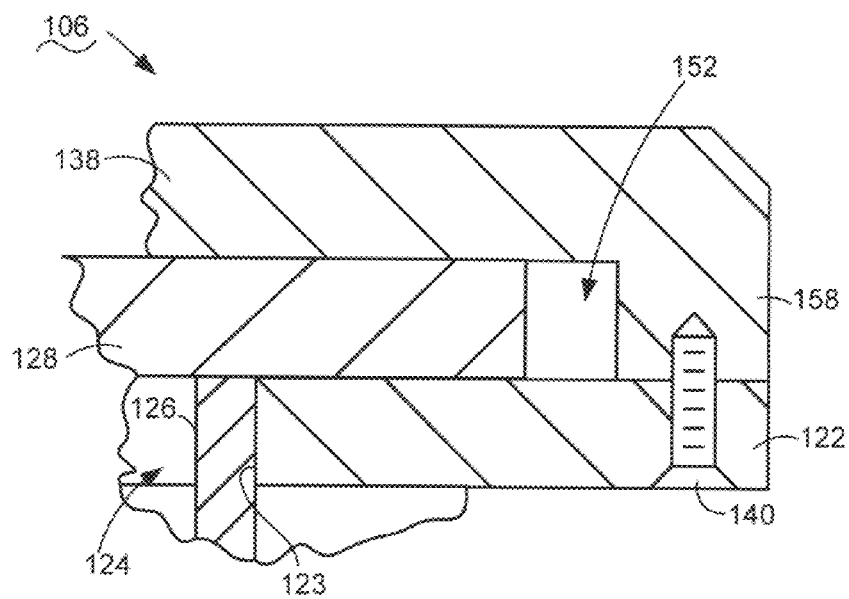

A clearance is necessary between the top plate 138 and the sub plate 122 to prevent the head 128 from obstructing the lateral movement of the top plate 138. FIGS. 6 and 7 are similar cross sectional depictions of a portion of the workpiece positioner 106. As discussed, the lateral movement of the top plate 138 is controlled by the sandwiched constraint of the head 128 between the sub plate 122 and the top plate 138. That is, during the lateral movement the under side planar surface 136 of the head 128 slidingly engages an upper side planar surface 153 of the sub plate 122, an upper side planar surface 154 of the head 128 slidingly engages an under side planar surface 156 of the top plate 138, and an under side planar surface 155 of the sub plate 122 slidingly engages the planar surface 120 of the support member 118. Accordingly, in the illustrative embodiments there are three sets of mating surfaces in sliding engagement with each other. In alternative equivalent embodiments only two sets can be employed, such as by lengthening the pin 126 or shortening the head 128 to clearingly disengage a set of the mating surfaces.

In any event, the under side planar surface 156 of the top plate 138 terminates at a peripheral standoff edge 158 forming a central cavity 152 for clearingly disengaging the head 128 during the lateral movement.

FIG. 6 depicts a particular lateral position of the top plate 138 where the pin 126 is substantially centrally disposed in the aperture 124 defined by the sub plate 122. In this lateral position the cavity 152 extends peripherally around the head 128 so that the top plate 138 clearingly disengages the head 128 to permit lateral movement of the top plate 138 in any lateral direction.

In FIG. 7 the top plate 138 has been moved laterally to the left in comparison to the position previously depicted in FIG. 6. The limit of lateral movement in that direction is reached when the surface 123 (defining the aperture 124 in the sub plate 122) abuttingly engages the pin 126. FIG. 7 depicts how the components are sized so that the surface 123 preferably abuttingly engages the pin 126 before the head 128 abuttingly engages the standoff edge 158, so that the surface 123 movement with respect to the pin 126 determines the range of lateral motion of the top plate 138.

Figure 8:
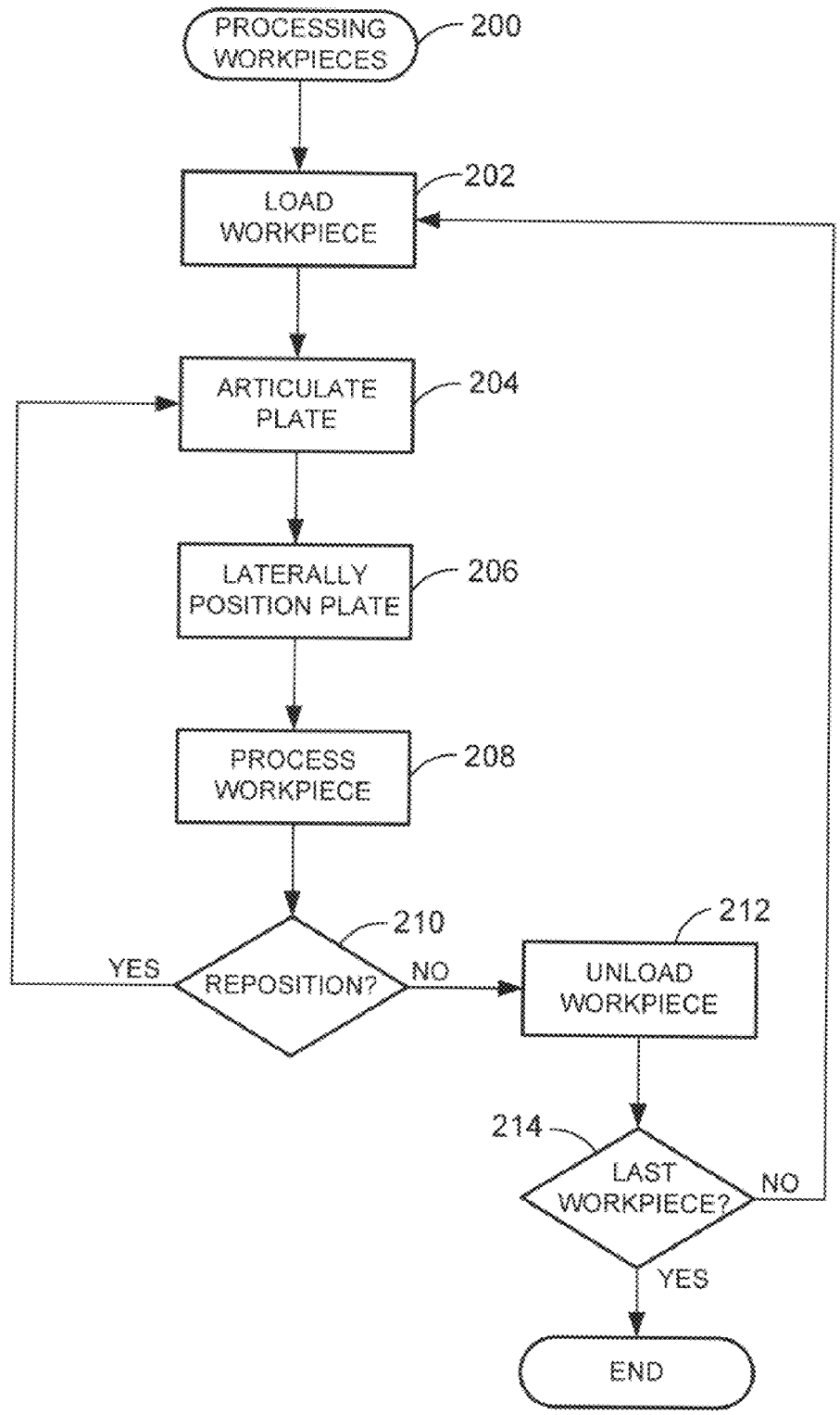
FIG. 8 is a flowchart depicting steps in a method for PROCESSING WORKPIECES in accordance with embodiments of the present invention.

FIG. 8 is a flowchart depicting general steps for practicing a method 200 of PROCESSING WORKPIECES in accordance with embodiments of the present invention. The method begins in block 202 by loading a workpiece to the workpiece positioner. Preferably, the loading step emulates the ease and rapidity of grasping the workpiece with the human hand. For example, nesting the workpiece into a closely contoured feature in the top plate provides the necessary support without the need for cumbersome attachment fasteners and clamps and the like.

With the workpiece loaded, control passes to block 204 where the operator urges the top plate rotationally to articulate the ball-and-socket joint in order to dispose the top plate in a corresponding plane that presents the workpiece at a desired angle for processing. The frictional engagement between the members of the ball-and-socket joint retain the top plate in that corresponding plane. While remaining in that corresponding plane, the operator can then urge the top plate laterally in block 206 to further reposition the workpiece as desired.

With the workpiece positioned as desired, processing the workpiece begins in block 208. In block 210 it is determined whether repositioning the workpiece would be beneficial. If the determination of block 210 is yes, then control returns to block 204; otherwise, the workpiece is unloaded in block 212 when processing is completed. The determination of block 214 returns control to block 202 if there are more workpieces to process; otherwise, the method 200 ends.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to illustrative embodiments describing a workpiece positioner for fixturing a workpiece during processing, it will be appreciated by those skilled in the art that the claimed subject matter is not so limited and various other systems and other devices within systems can utilize the present embodiments without departing from the spirit and scope of the claimed invention.

What is claimed:

1. A workpiece positioner for positioning a workpiece, the workpiece positioner comprising:
   a fixed base;
   a support member connected to the base by a joint that permits selectively articulating the support member with respect to the base;
   a plate defining an aperture adjacent the support member, and the plate also defining a feature sized for operably supporting the workpiece; and
   a connector passing through the aperture connecting the plate to the support member, the connector fixing the plate in articulation with the support member so that a selected articulation of the support member with respect to the base defines a corresponding plane in which the plate is disposed, and the connector permitting sliding movement of the plate with respect to the connector in any direction within the corresponding plane to orient the workpiece in a desired position.

2. The workpiece positioner of claim 1 wherein the joint comprises a ball and socket joint.

3. The workpiece positioner of claim 1 wherein the support member defines a planar surface that is contiguous with at least a partially spherical surface that matingly engages a socket defined by the base permitting the planar surface to be articulated in any direction with respect to the base.

4. The workpiece positioner of claim 3 wherein the partially spherical surface is substantially hemispherical.

5. The workpiece positioner of claim 1 wherein the support member supports a protuberant pin such that the sliding movement of the plate is limited by a contacting engagement of the pin against a surface of the plate defining the aperture.

6. The workpiece positioner of claim 5 comprising a head at a distal end of the pin that is sized larger than the aperture in the plate constraining the plate in the sliding movement the support member.

7. The workpiece positioner of claim 6 wherein the head is removably connected to the pin.

8. The workpiece positioner of claim 7 comprising a threaded fastener operably connecting the head to the pin.

9. The workpiece positioner of claim 6 further comprising a top plate that defines the feature sized for operably supporting the workpiece, the top plate operably connected to the plate and fixed in movement therewith, the top plate defining a peripheral standoff edge and a cavity formed within the standoff edge that is sized to clearingly disengage the head during the sliding movement.

10. The workpiece positioner of claim 9 further comprising a threaded fastener operably connecting the top plate to the plate.

11. The workpiece positioner of claim 1 wherein the feature is characterized by a first feature sized to receivingly engage a first workpiece and a second feature sized differently than the first feature and sized to receivingly engage a second workpiece.

12. A workpiece positioner comprising:
a fixed base defining a socket;
a support member defining a planar surface and a ball end, the ball end cooperatively engageable with the socket to permit selectively articulating the planar surface in any direction with respect to the base;
a sub plate defining an aperture;
a stake connecting the sub plate to the support member, the stake having a head portion and a pin portion extending from the head and passing through the aperture to connect to the support member, the sub plate operably constrained between the head and the planar surface to fix the sub plate in articulation with the support member so that a selected articulation of the support member with respect to the base defines a corresponding plane in which the sub plate is disposed, and further operably constrained between the head and the planar surface to permit lateral movement of the sub plate in any direction within the corresponding plane; and
a top plate affixed to the sub plate to permit movement together in unison, the top plate defining a feature sized for operably supporting a workpiece at the selected articulation and the selected lateral position.

13. The workpiece positioner of claim 12 wherein the ball end comprises a substantially hemispherical surface.

14. The workpiece positioner of claim 12 wherein the lateral movement of the sub plate is limited by a contacting engagement of the pin against a surface of the sub plate defining the aperture.

15. The workpiece positioner of claim 12 wherein the head is removably connected to the pin.

16. The workpiece positioner of claim 15 comprising a threaded fastener operably connecting the head to the pin.

17. The workpiece positioner of claim 12 wherein the top plate defines a peripheral standoff edge and a cavity defined within the standoff edge that is sized to clearingly disengage the head during the lateral movement of the sub plate and top plate with respect to the support member.

18. The workpiece positioner of claim 12 further comprising a threaded fastener operably connecting the top plate to the sub plate.

19. The workpiece positioner of claim 12 wherein the top plate has a first surface defining a first feature sized to receivingly engage a first workpiece and the top plate has a second surface defining a second feature sized differently than the first feature to receivingly engage a second workpiece.

20. A method comprising:
obtaining a workpiece positioner having a base, a support member connected to the base by a joint that permits selectively articulating the support member with respect to the base, a plate defining an aperture adjacent the support member, the plate also defining a support feature sized for operably supporting the workpiece, and a connector passing through the aperture connecting the plate to the support member, the connector fixing the plate in articulation with the support member so that a selected articulation of the support member with respect to the base defines a corresponding plane in which the plate is disposed, and the connector permitting sliding movement of the plate with respect to the connector in any direction within the corresponding plane to orient the workpiece in a desired position;
supporting a workpiece by engaging it hands-free by the support feature;
articulating the support feature to a selected angle to dispose the support feature in a corresponding plane by articulating a joint supporting the support feature with respect to the base; and
sliding the support feature in any direction within the corresponding plane with respect to the base to dispose the support feature in a desired working position.

* * * * *